United States Patent
Huang et al.

(10) Patent No.: US 12,323,321 B2
(45) Date of Patent: Jun. 3, 2025

(54) ADAPTIVE CONTROL LOOP ROUTING VIA CASCADING CONTROLLERS

(71) Applicant: Stripe, Inc, South San Francisco, CA (US)

(72) Inventors: Ji Huang, Bothell, WA (US); Stefan Gawrys, Seattle, WA (US)

(73) Assignee: Stripe, Inc., South San Francisco, CA (US)

( * ) Notice: Subject to any disclaimer, the term of this patent is extended or adjusted under 35 U.S.C. 154(b) by 43 days.

(21) Appl. No.: 18/236,364

(22) Filed: Aug. 21, 2023

(65) Prior Publication Data

US 2025/0071048 A1    Feb. 27, 2025

(51) Int. Cl.
*H04L 45/24*    (2022.01)
*H04L 45/00*    (2022.01)
*H04L 45/12*    (2022.01)
*H04L 45/302*    (2022.01)

(52) U.S. Cl.
CPC ............ *H04L 45/24* (2013.01); *H04L 45/124* (2013.01); *H04L 45/22* (2013.01); *H04L 45/302* (2013.01)

(58) Field of Classification Search
CPC ....... H04L 45/24; H04L 45/124; H04L 45/22; H04L 45/302; H04L 45/121; H04L 45/247
See application file for complete search history.

(56) References Cited

U.S. PATENT DOCUMENTS

| | | | |
|---|---|---|---|
| 2009/0276518 A1* | 11/2009 | Burkard | H04L 47/28 709/224 |
| 2011/0032833 A1* | 2/2011 | Zhang | H04L 45/70 709/239 |
| 2012/0063308 A1* | 3/2012 | Sohn | H04L 47/12 370/232 |
| 2018/0131606 A1* | 5/2018 | Bergman | H04L 45/70 |
| 2019/0089812 A1* | 3/2019 | Guo | H04L 67/142 |
| 2019/0173901 A1* | 6/2019 | Mi | H04L 45/02 |
| 2020/0228437 A1* | 7/2020 | Srinivasa Murthy | H04L 41/22 |
| 2021/0243095 A1* | 8/2021 | Attarwala | H04L 45/124 |
| 2021/0329528 A1* | 10/2021 | Kang | H04L 47/283 |

* cited by examiner

*Primary Examiner* — Johnny B Aguiar
(74) *Attorney, Agent, or Firm* — BAKERHOSTETLER (57) ABSTRACT

Aspects of the subject technology include receiving from a user device a request for obtaining data associated with the user device. The request is addressed to a destination device. Aspects also include determining with a first controller whether to transmit the request to the destination device via a first path. The determination is based on a first success rate of the first path. Aspects also include transmitting the request to the destination device via the first path in response to a determination to transmit the request to the destination device via the first path. Aspects also include determining, with a second controller, whether to transmit the request to the destination device via a second path, in response to a determination not to transmit the request via the first path. The determination is based on a second success rate of the second path.

20 Claims, 6 Drawing Sheets

ADAPTIVE CONTROL LOOP ROUTING VIA CASCADING CONTROLLERS

TECHNICAL FIELD

The present description generally relates to network traffic management and, more particularly, to network traffic routing via cascading controllers, such as cascading proportional-integral-derivative (PID) controllers.

BACKGROUND

Service providers may receive requests at their servers for accessing their service. The request may be provided by a user via one of multiple paths, such as direct link with the service provider server and/or via a third-party intermediary.

BRIEF DESCRIPTION OF THE DRAWINGS

Certain features of the subject technology are set forth in the appended claims. However, for the purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology provide a routing system that determines an efficient allocation of network traffic from client devices across different paths to a destination device, such as a server. The different paths may include, for example, one or more direct links (e.g., integrations) from the routing system to the destination device and/or one or more indirect links from the routing system to the destination device. An indirect link may be a connection that involves one or more intermediary devices, servers, and/or services (e.g., link aggregators).

In the subject system, each of the different paths to the endpoint may be associated with a controller, such as a proportional-integral-derivative (PID) controller. The different controllers may be arranged in a cascading structure based on a predefined order of preferred paths (e.g., ordered based on cost, speed, etc.). Each controller may be configured to monitor a success rate for its associated path (e.g., a success rate of the transmission of requests over the associated path). Each controller may determine (e.g., based on its monitored success rate) whether to allow a given request to be transmitted over its associated path or to let the request pass to the next controller in the cascading structure, such as to steer the controller's success rate toward a target success rate value. In this manner, the subject system can allocate traffic across the different links (also referred to herein as paths) in a manner that optimizes both cost and success rate.

Figure 1:
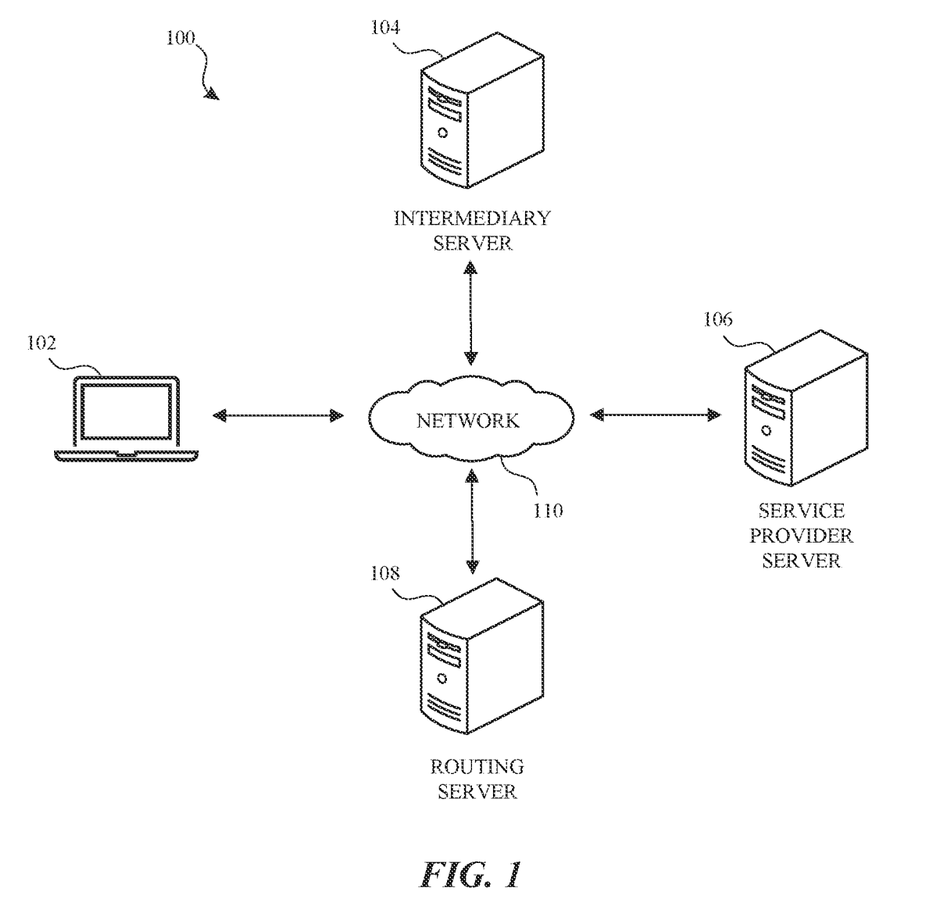
FIG. 1 illustrates an example network environment in which the subject technology may be implemented in accordance with one or more implementations.

FIG. 1 illustrates an example network environment 100 in which the subject technology may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, an intermediary server 104, a service provider server 106, and a routing server 108. The network 110 may communicatively (directly or indirectly) couple one or more of the electronic device 102, the intermediary server 104, the service provider server 106, and the routing server 108. In one or more implementations, the network 110 may be an interconnected network of devices that may include, or may be communicatively coupled to, the Internet.

For explanatory purposes, the network environment 100 is illustrated in FIG. 1 as including the electronic device 102, the intermediary server 104, the service provider server 106, and the routing server 108; however, the network environment 100 may include any number of electronic devices and/or any number of servers communicatively coupled to each other directly or via the network 110. In addition, the various systems of FIG. 1 may be, and/or may include all or part of, the electronic system discussed below with respect to FIG. 6.

The electronic device 102 may be, for example, a wearable device (such as a watch, a band, and the like), a desktop computer, a portable computing device (e.g., a laptop computer), a smartphone, a peripheral device (e.g., a digital camera, headphones), a tablet device, or any other appropriate device that includes, for example, one or more wireless interfaces, such as wireless local area network (WLAN) radios, cellular radios, Bluetooth radios, Zigbee radios, near field communication (NFC) radios, and/or other wireless radios. In FIG. 1, by way of example, the electronic device 102 is depicted as a laptop computer. The electronic device 102 may be associated with one or more accounts, credentials, or any other identity information registered with the service provider server 106 belonging to a user associated with the electronic device 102.

The service provider server 106 may be and/or may include, for example, one or more servers that host or facilitate a service that may be used by one or more parties (e.g., the electronic device 102). The service provider server 106 may store account information (e.g., user account, usernames/handles, or any other account-specific data) associated with the electronic device 102 and/or users thereof and/or users associated therewith. The service provider server 106 may be, and/or may include all or part of, the electronic system discussed below with respect to FIG. 6. The service provider server 106 may be accessed via one or more links as described above. The links may be utilized directly, for example, by the electronic device 102 and/or the intermediary server 104. In some implementations, the service provider server 106 may not allow direct access to users (e.g., the electronic device 102) but may provide access to its services to one or more third parties (e.g., the intermediary server 104).

The intermediary server 104 may be and/or may include, for example, one or more servers that provide (e.g., to the electronic device 102) service(s) or software that acts as a central hub or intermediary, collecting and/or consolidating data or resources (e.g., direct links) from multiple servers (e.g., the service provider server 106) or systems into a unified interface or platform. The intermediary server 104 may store account information (e.g., user account, usernames/handles, or any other account-specific data) associated with the electronic device 102 and/or users thereof and/or users associated therewith. The intermediary server 104 may be configured to send/receive network traffic (e.g., user requests) sent between user(s) (e.g., the user of the electronic device 102) and service provider(s) (e.g., the service provider server 106). The intermediary server 104 may be, and/or may include all or part of, the electronic system discussed below with respect to FIG. 6.

The routing server 108 may be and/or may include, for example, one or more servers that provide (e.g., to the electronic device 102) service(s) or software that may receive and/or generate network traffic destined for a service provider (e.g., the service provider server 106). The routing server 108 may include a data structure (e.g., a list or directory) that includes one or more paths to a service provider (e.g., the service provider server 106). The paths may include one or more aggregators (e.g., the intermediary server 104) and/or one or more direct links (e.g., with the service provider server 106). The routing server 108 may include a respective controller associated with each path may that determines whether to send network traffic (e.g., user requests) to the service provider via the path. The controllers may be arranged in a cascading structure such that if a first controller decides not to handle (e.g., send) the network traffic via its corresponding path, the first controller may allow a subsequent controller to decide whether to handle the network traffic via its corresponding path, and so on until the network traffic is handled or until there are no more subsequent controllers, in which case the last controller handles the network traffic. The routing server 108 may also be configured to calculate one or more metrics associated with the path(s), such as latency, success rate, bandwidth, availability, and the like, which may be used by the controllers in their respective determinations of whether network traffic should be transmitted to via their associated paths.

Figure 2:
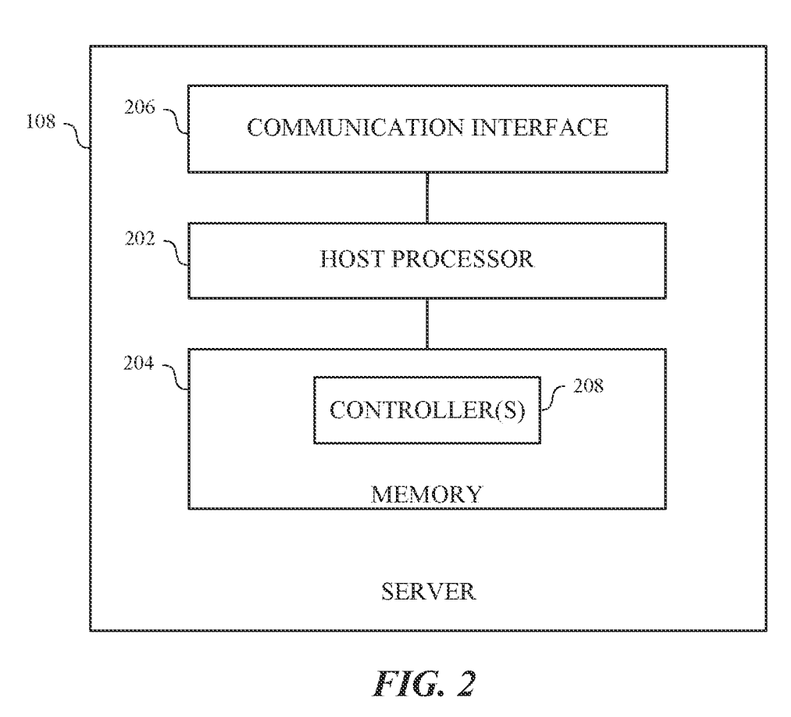
FIG. 2 depicts an example server that may implement the subject technology in accordance with one or more implementations.

FIG. 2 depicts an example server that may implement the subject technology in accordance with one or more implementations. For explanatory purposes, FIG. 2 is primarily described herein with reference to the routing server 108 of FIG. 1. However, this is merely illustrative, and features of the server of FIG. 2 may be implemented in any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The routing server 108 may include one or more of a host processor 202, a memory 204, and/or a communication interface 206. The host processor 202 may include suitable logic, circuitry, and/or code that enable processing data and/or controlling operations of the routing server 108. In this regard, the host processor 202 may be enabled to provide control signals to various other components of the routing server 108. The host processor 202 may also control transfers of data between various portions of the routing server 108. The host processor 202 may further implement an operating system or may otherwise execute code to manage operations of the routing server 108.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage). In one or more implementations, the memory 204 may store one or more controllers 208, each of which may be associated with a particular path to an external service (e.g., the service provider server 106).

The communication interface 206 may include suitable logic, circuitry, and/or code that enables wired or wireless communication, such as between the electronic device 102, the intermediary server 104, the service provider server 106, and/or the routing server 108. The communication interface 206 may include, for example, one or more of a Bluetooth communication interface, an NFC interface, a Zigbee communication interface, a WLAN communication interface, a universal serial bus (USB) communication interface, a cellular interface, or generally any communication interface.

In one or more implementations, one or more of the host processor 202, the memory 204, the communication interface 206, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
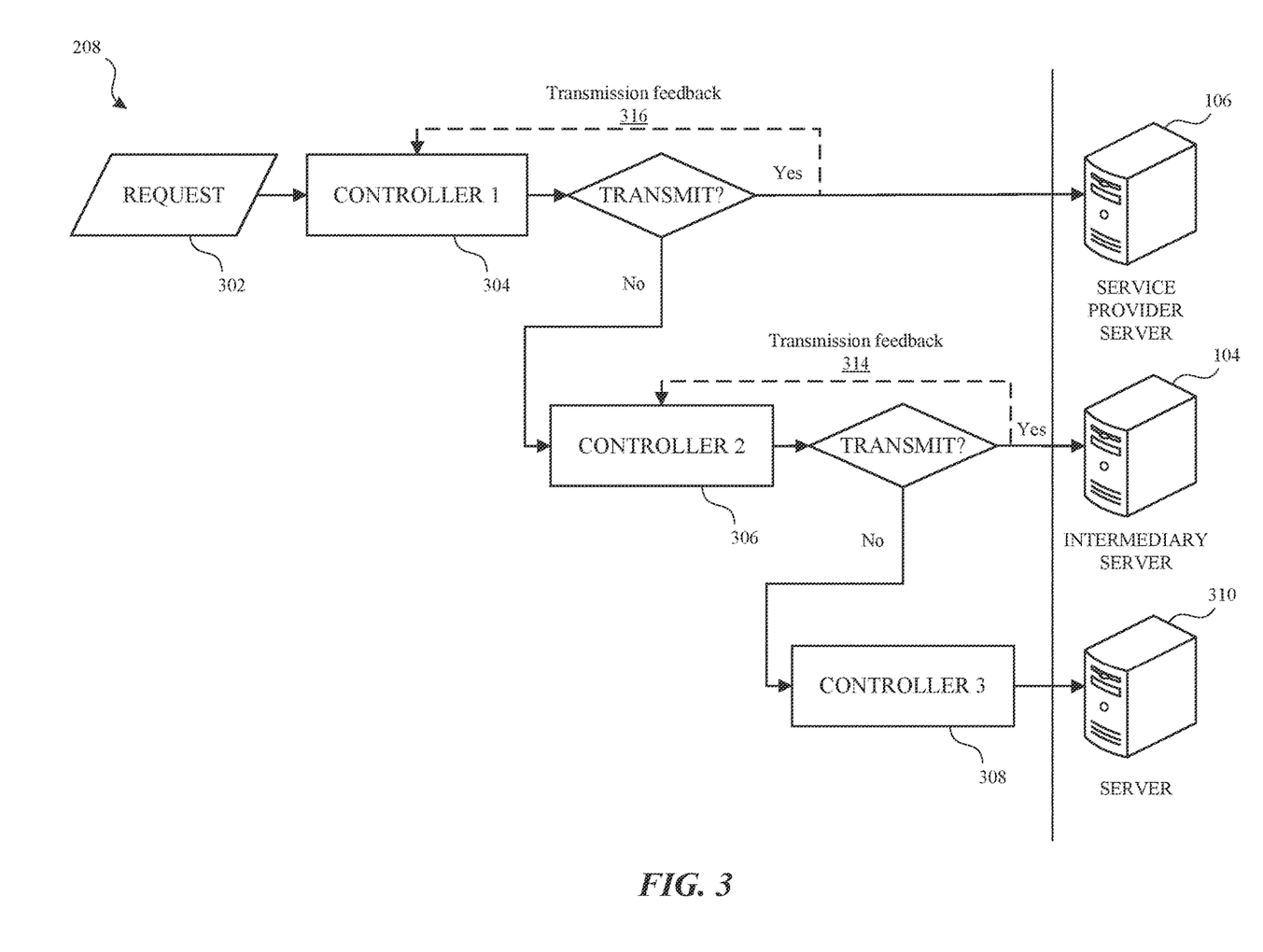
FIG. 3 depicts a diagram of an example implementation of cascading controllers in accordance with one or more implementations.

FIG. 3 depicts a diagram of an example implementation of cascading controllers, in accordance with one or more implementations. The routing server 108 may receive and/or generate a request 302. A request may refer to a signal, message, or other data sent by a client application or device (e.g., the electronic device 102) for transmission to a server (e.g., the service provider server 106), such as for retrieving and/or manipulating data and/or resources. The request may serve as a fundamental mechanism for communication and interaction between clients and servers in a networked environment, and may, in one or more implementations, typically follow a standardized protocol, such as HTTP (Hypertext Transfer Protocol). Although FIG. 3 is discussed with respect to a single request 302, any number of requests are contemplated, and a similar process may be provided for each request.

For the request 302, the routing server 108 may select a path through which to send the request 302 to the service provider server 106. To select a path, the request 302 may be provided to a set of cascading controllers. As shown in FIG.

3, the cascading controllers include a first controller 304 (corresponding to a direct connection to the service provider server 106), a second controller 306 (corresponding to an indirect connection to the service provider server 106 via an intermediary server 104), and a third controller 308 (corresponding to a server 310 which may represent some other link or intermediary that ultimately communicates with the service provider server 106). Although only three controllers and paths are shown, any number of controllers and paths are contemplated.

The first controller 304, second controller 306, and third controller 308 may be arranged in order of preference. For example, the controllers may be arranged in order of cost effectiveness of their corresponding paths. In some implementations, in a steady state scenario, requests may default to being sent via the path associated with the first controller 304. If a path is partially degraded (e.g., the number of requests being sent via the path per time period and/or latency is above a threshold), some or all requests may be redirected to a second path. If the other path is also partially degraded, some or all requests may be redirected to a third path. One benefit of the subject technology is the distribution of requests across each path that maximizes the success rate of the paths, where success rate may be measured as a function of the availability and/or latency of the path over a period of time, a number/percent of requests successfully transmitted over the path over a period of time, or any other link related metric. Another benefit of the subject technology is the distribution of requests across each path that also or instead minimizes the cost of utilizing the paths.

When the request 302 is received, the first controller 304 may decide whether to handle the request 302 via its associated path. The decision may be based on, for example, the proportional, integral, and/or derivative computations of a parameter (e.g., success rate) of the path corresponding to the first controller 304. If the first controller 304 decides to handle the request 302, the first controller 304 may cause the request 302 to be sent to the service provider server 106 via a direct link with the service provider server 106, for example, by sending a control signal to the communication interface 206 instructing the communication interface 206 to send the request 302.

In response to the request 302, the routing server 108 may receive transmission feedback 316 (e.g., from the service provider server 106) in the form of an acknowledgment, response, or any other message, which may include information that the first controller 304 may use to update the success rate of its corresponding path (e.g., the direct link with the service provider server 106). The information included in the transmission feedback 316 may include bandwidth, latency, connection status, and/or any other information relating to the connection between the routing server 108 and the service provider server 106.

If the first controller 304 decides not to handle the request 302, the routing of the request 302 may pass to the second controller 306. The decision at the second controller 306 may be based on the proportional, integral, and/or derivative computations of a parameter (e.g., success rate) of the path corresponding to the second controller 306. If the second controller 306 decides to handle the request 302, the second controller 306 may cause the request 302 to be sent to the service provider server 106 via an intermediary server 104, for example, by sending a control signal to the communication interface 206 instructing the communication interface 206 to send the request 302 to the intermediary server 104.

In response to the request 302, the routing server 108 may receive transmission feedback 314 (e.g., from the service provider server 106 and/or the intermediary server 104) in the form of an acknowledgment, response, or any other message, which may include information that the second controller 306 may use to update the success rate of its corresponding path. The information included in the transmission feedback 314 may include bandwidth, latency, connection status, and/or any other information relating to the connection between the routing server 108, the intermediary server 104, and/or the service provider server 106.

If the second controller 306 decides not to handle the request 302, the routing of the request 302 may continue to pass to each subsequent controller until the request 302 is handled. The set of controllers 208 may include a final controller, which in this instance is the third controller 308. In some implementations, the request 302 may proceed directly to the controller that handled the previous request.

Figure 4:
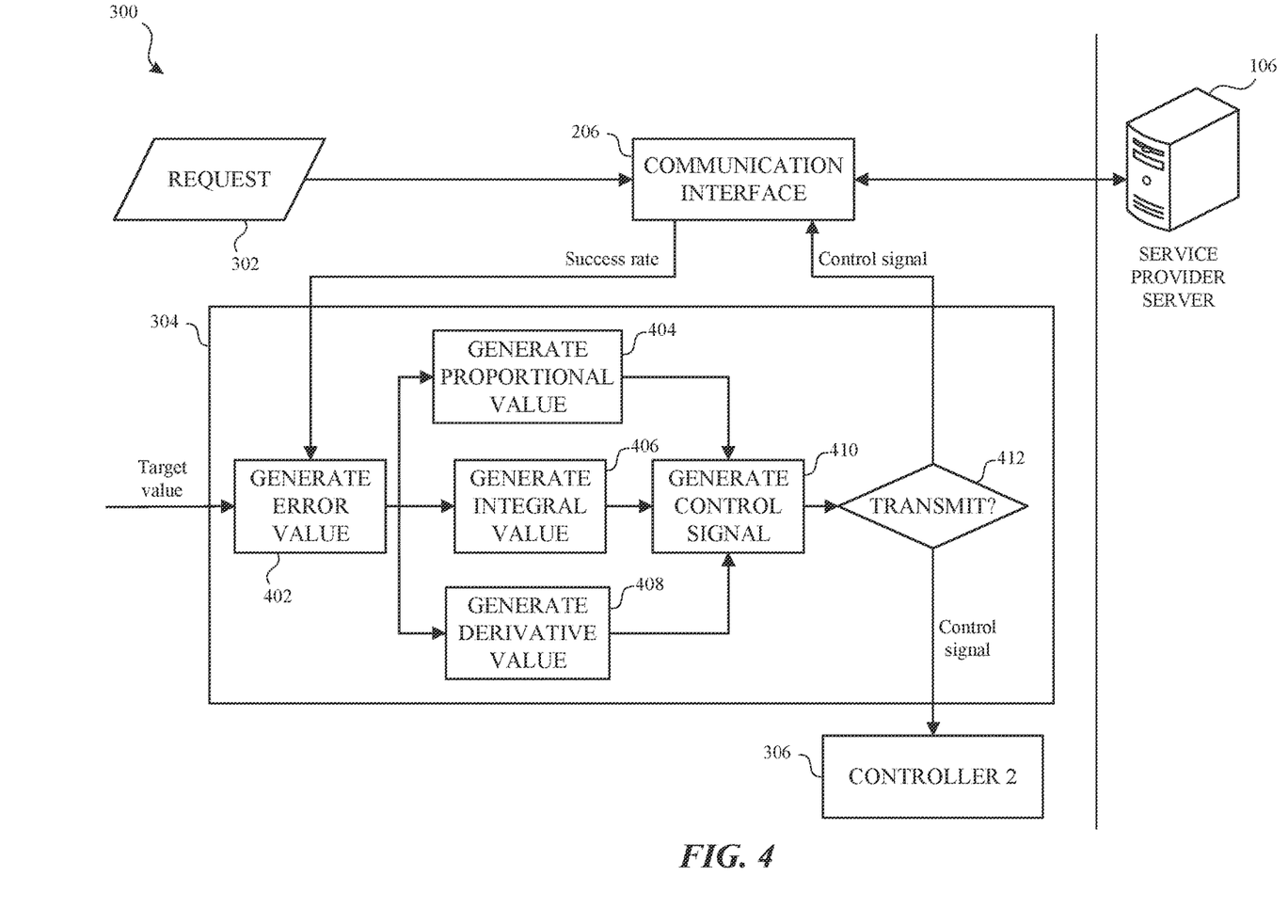
FIG. 4 depicts a diagram of an example PID controller in accordance with one or more implementations.

FIG. 4 depicts a diagram of the controller 304 embodied as a PID controller, in accordance with one or more implementations. A PID controller may be a feedback control mechanism designed to regulate (e.g., optimize) network traffic flow based on parameters, such as maximizing success rate and/or minimizing cost. A PID controller may generally operate by monitoring (e.g., continuously) the current state of the network, comparing it to a predefined setpoint (e.g., target success rate), and adjusting control variables to minimize deviations and maintain stability. To determine an appropriate corrective action (e.g., providing the request to another PID controller), the PID controller may include three components: proportional, integral, and derivative. The proportional component may determine the corrective action based on the magnitude of the error (e.g., the difference between the current success rate and the target success rate). The integral component may consider the accumulated error over time to help reduce any steady state errors. The derivative component may consider the rate of change of the error and may generate an output that anticipates future changes. In some implementations of the subject technology the controllers (e.g., the controller 304-308 may be PID controllers).

The controller 304 may receive as input a success rate (or any other current metric) of its corresponding path, in this case a direct link with the service provider server 106, and/or a target value, in this case a target success rate (or any other target corresponding to the current metric).

In some implementations, the goal of the controller 304 may be to maximize the target value, in which case the target success rate may be 100%.

In some implementations, the controller 304 may also or instead receive a minimum acceptance rate such that the network traffic handled (e.g., accepted, sent, transported, and the like) via the corresponding path of the controller 304 does not go below the minimum acceptance rate. In some implementations, the controller 304 may also or instead receive other variables, such as costs, and target values corresponding thereto.

The input values, in this case target value and the success rate, may be used to generate an error value (402), which may be a measure of the discrepancy (e.g., difference) between the target value and the success rate.

Based on the error value, the controller 304 may generate a proportional value (404) responding to the present error. If the actual success rate is much lower than the target (e.g., indicating many unsuccessful connections), the proportional value may contribute to (e.g., result in) a strong control signal (e.g., proportional to the error value), indicating a potential response of re-routing (e.g., transmitting to the service provider server 106 via a different path) network traffic, such as the request 302.

The controller 304 may also or instead generate an integral value (406) representing the accumulated past errors. If the path (e.g., the direct link with the service provider server 106) has been consistently underperforming (e.g., with a success rate persistently below the target value), the integral value may contribute more to the control signal, encouraging more traffic to be re-routed (e.g., transmitting to the service provider server 106 via a different path).

The controller 304 may also or instead generate a derivative value (408) representing a prediction of future errors based on the current rate of change of the error value. If the success rate is rapidly decreasing, the derivative value may contribute to (e.g., result in) a strong control signal to start re-routing traffic immediately, even before the success rate has dropped below the target value.

The control signal may be generated (410) as a function of variables including the proportional value (404), integral value (406), and/or derivative value (408). The control signal may be compared to a threshold level for determining whether to transmit (412) the request 302 to the service provider server 106 by instructing (e.g., sending the control signal to) the communication interface 206 to send (e.g., transmit, transfer, or otherwise provide) the request 302 via the path corresponding to the controller 304 (e.g., the direct link with the service provider server 106) or re-route the traffic (e.g., to the next controller 306). In some implementations, the threshold level may be a predetermined fixed value that is, for example, set based on empirical observations, theoretical analysis, or arbitrarily chosen and subsequently fine-tuned. In some implementations, the threshold level may be based on the ongoing performance of the path. For example, if the success rate of the path is above a certain amount, the threshold may be raised to make better use of paths that might be underutilized. In some implementations, the threshold may be adjusted based on external factors or conditions. For example, during periods of high network traffic, it might be beneficial to use a higher threshold to spread the load more evenly across the available paths.

If the traffic is re-routed, the subsequent controller 306 may receive the control signal, target value, and/or success rate (or any other current and target variables, such as cost). The controller 306 may make its own assessment of whether to send the request 302 via its corresponding path (e.g., via the intermediary server 104) based on its parameters (e.g., current/target success rate and/or current/target cost). This process may continue until a suitable path is found or there are no other paths by which to send the request 302.

Figure 5:
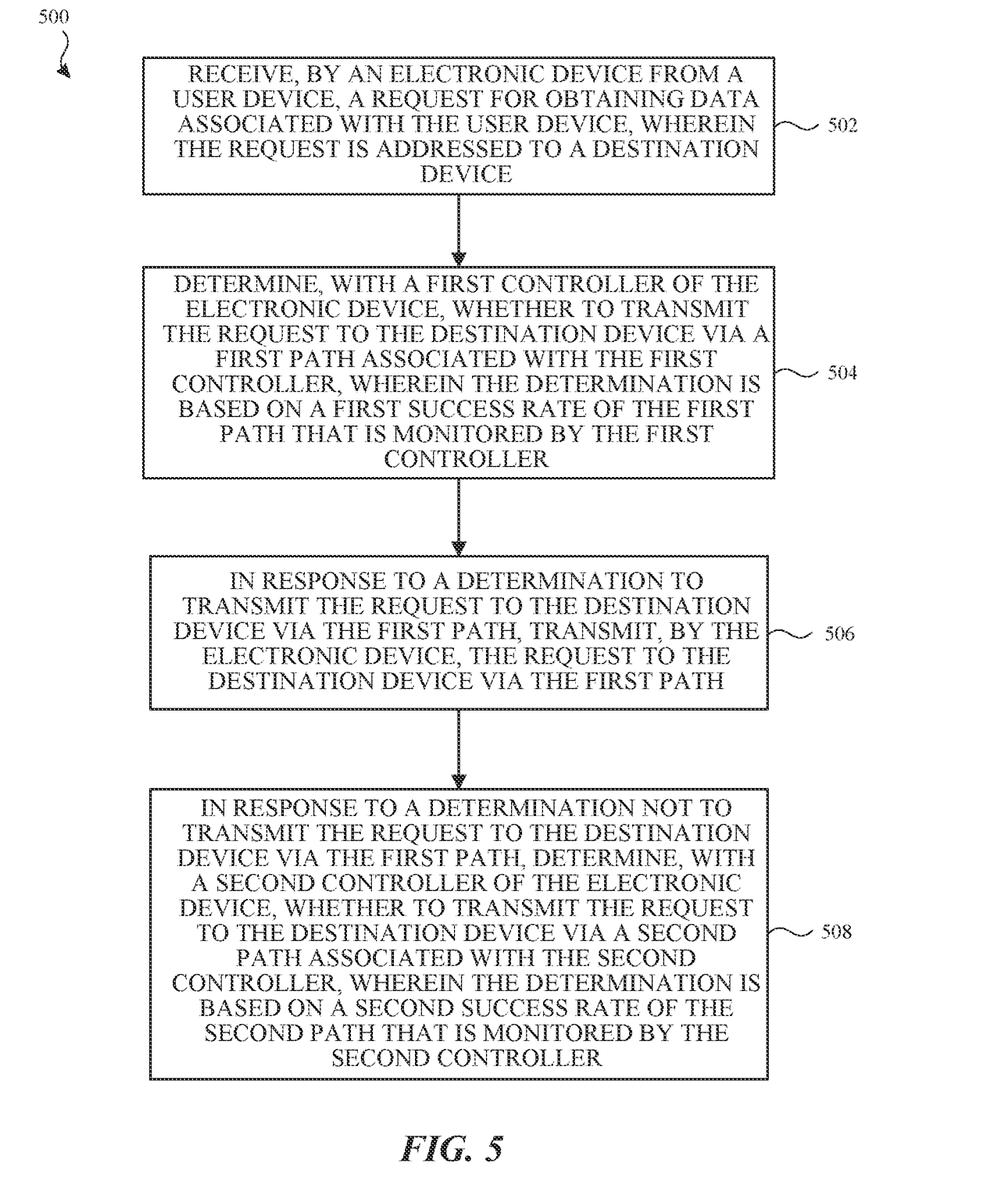
FIG. 5 depicts a flow diagram of an example process for routing via cascading controllers in accordance with one or more implementations.

FIG. 5 depicts a flow diagram of an example process 500 for routing via cascading controllers, in accordance with one or more implementations. For explanatory purposes, the process 500 is primarily described herein with reference to the electronic device 102, the intermediary server 104, the service provider server 106, and the routing server 108 of FIG. 1. However, the process 500 is not limited to the electronic device 102, the intermediary server 104, the service provider server 106, and the routing server 108, and one or more blocks of the process 500 may be performed by one or more other by other suitable devices. Further, for explanatory purposes, the blocks of the process 500 are described herein as occurring sequentially or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, an electronic device (e.g., the routing server 108) may receive from a user device (e.g., the electronic device 102) a request for obtaining data associated with the user device. The request may be addressed to a destination device (e.g., the service provider server 106).

The request may be for data associated with the user device. This data could be any information relevant to the user device, such as user data, device status data, or other application-specific data. The request may be made using a certain protocol (such as hypertext transfer protocol secure (HTTP/S) or a specific application programming interface (API) protocol) and include details like the type of request, any appropriate parameters, and authentication credentials if necessary.

The destination device may be a specific server or another type of device that stores, processes, or generates the data being requested by the user device. The destination device may be responsible for processing the request and providing a response, which could include the requested data, an acknowledgment of the request, an error message, transmission feedback (e.g., transmission feedback 316), or other types of responses.

The user device may send the request to the electronic device, which may receive the request and recognizes that it is addressed to a specific destination device. The electronic device may then perform certain operations, such as validating the request, routing the request to the destination device, processing the request, and/or responding back to the user device. It should be understood that, although process 500 is discussed with respect to a single request, user device, and destination device, the process 500 is not limited to one of each and that one or more of any of such components are contemplated.

The electronic device may also include one or more controllers (e.g., first controller 304, second controller 306, and third controller 308), which determine whether a request should proceed to be transmitted via a path corresponding to the respective controller. In some implementations, before receiving the request, the electronic device may arrange the controllers due to their cascading configuration, as described in more detail with respect to FIG. 3. For example, the controllers may be arranged based on a predetermined prioritization of one or more paths, each corresponding to a controller. This way, a controller corresponding to the path with a higher priority may receive the request before another controller corresponding to another path with a lower priority.

In some implementations, the predetermined prioritization of the one or more paths may be based on a cost. A controller's cost may be related to the expense involved in transmitting data via the path managed by that controller. This cost may come from various factors such as the computational resources used, network usage, and/or fees charged by third-party services involved in handling the data transmission. For instance, if a path includes an API provided by an aggregator, there may be a fee schedule related to using this API, which could vary based on factors like volume of data, frequency of use, or the type of data being transmitted. In practical terms, the electronic device may arrange its controllers so that the one associated with the lowest cost path has priority and will be the first to receive and handle a request. If that controller, for some reason, cannot successfully handle the request (due to factors like a low success rate, unavailability, etc.), then the request may move on to the second controller associated with the next most cost-effective path, and so on. This strategic arrangement allows the system to manage costs efficiently while also providing a fallback mechanism to ensure requests can still be handled even if the primary, most cost-effective path is not available or optimal.

In some implementations, the electronic device may periodically re-arrange the controllers. The arrangement of the controllers may be updated based on, for example, updated prioritizations, updated metrics, and the like.

At block 504, a first controller of the electronic device may determine whether to transmit the request to the destination device via a first path associated with the first controller. The first controller may be a controller within the electronic device and may decide whether or not to transmit a request to a destination device via a first path. This decision-making process may be informed by a first success rate of that path (and/or other attributes, such as cost), which may be monitored by the controller.

The first controller may monitor (e.g., continuously) the success rate of data transmission over its associated path. This success rate may depend on several factors, such as the availability of the path (e.g., how often it is operable and not congested or down) and the latency of the path (e.g., how much delay occurs during data transmission). Based on these factors, the controller may determine whether to route the request via its associated path. The determination may involve comparing the monitored success rate to a certain standard or threshold. If the success rate meets or exceeds this standard, the controller may choose to transmit the request to the destination device using its associated path. In some implementations, the first controller may receive the success rate of data transmission over its associated path from, for example, the destination server of the path (e.g., as part of transmission feedback 316).

In some implementations, a minimum acceptance rate might be set for the controller representing a predefined threshold set so that each controller handles a certain minimum proportion of the total requests it receives, regardless of the decision that controller made to handle the request. The minimum acceptance rate may be a predetermined threshold that, when met, proceeds with the transmission of the request through the controller's path regardless of the controller's decision. The minimum acceptance rate may serve as a fail-safe, for example, to fulfill the transmission of critical requests even in suboptimal conditions, to check on the status of a path after a period of inactivity, and/or to fulfill certain contractual obligations with network partners. This flexible mechanism allows for real-time adjustments in the routing of requests, improving the overall performance and responsiveness of the data transmission process.

In some implementations, a maximum acceptance rate might be set for the controller representing a different predefined threshold set so that each controller handles a certain maximum proportion of the total requests it receives, regardless of the decision that controller made to handle the request. The maximum acceptance rate may be a predetermined threshold that, when met, may cause the controller to pass the request to the next controller regardless of the controller's decision. The maximum acceptance rate may serve, for example, to provide a more even distribution of traffic, avoid overloading a path, and/or avoid breaching certain contractual obligations with network partners.

There may be scenarios where there is no second controller because the first controller is the final controller in the cascading list of controllers. In such scenarios, the first controller may proceed with the transmission of the request through the first controller's path, regardless of the controller's decision.

At block 506, in response to receiving a decision from the first controller to route the request via the first path, the electronic device may act accordingly to transmit the request to the destination device via the first path. The transmission may be initiated and managed by the electronic device, utilizing its network interface (e.g., communication interface 206) capabilities. The transmission process may involve packaging the user request into a suitable data packet or protocol format and sending it along the first path toward the destination device. The electronic device may employ appropriate network protocols and communication standards applicable for the transmission, such as transmission control protocol/internet protocol (TCP/IP), HTTP, and/or any other protocols. The transmission process may involve additional considerations such as encryption for security, fragmentation for packet size management, and error-checking mechanisms to ensure data integrity.

Upon successful transmission, the request may travel via the first path, traversing through any intermediary devices or networks as appropriate, ultimately reaching the destination device. The destination device may then process the received request and take appropriate action, such as retrieving or processing data, before possibly sending a response back to the user device, which may be through the electronic device.

In some implementations, following the transmission of a user request to a destination device, the electronic device may receive feedback on the status of that request from the destination device. The feedback may be in the form of an acknowledgment signal or more detailed status information, for example, providing insight into whether the request was successfully received and processed by the destination device. The status information may also or instead indicate if the request encountered any issues during transmission, such as latency, errors, or packet loss. Based on the status information, the electronic device may then update the success rate associated with the path (e.g., first or second path) used for the request transmission. The updated success rate may be utilized for subsequent decision-making processes by the controller (e.g., the first and/or second controllers). For example, the electronic device (e.g., via its controllers) may use the updated success rate for decisions related to routing future requests, altering the priority of different paths, and/or adjusting system parameters for improved performance.

At block 508, in response to receiving a decision from the first controller not to route the request via the first path (e.g., because the success rate of the first path does not meet certain standards or criteria), the electronic device may engage a second controller. The second controller may then decide whether to transmit the request via a second path, for example, based on its monitored success rate of the second path.

The second controller, which may be similar to the first, may monitor the success rate of data transmission over its respective path. The success rate can depend on various factors, such as the availability and latency of the second path. Based on these factors, the second controller may decide whether to route the request via the second path, which may involve comparing the success rate of the second path to a predefined threshold.

If the success rate meets or surpasses the threshold, the second controller may decide to transmit the request to the destination device using the second path. The cascading mechanism of engaging a second controller when the first one decides not to transmit the request provides a higher probability of successful data transmission by providing an alternative route for data flow, thereby improving the system's resilience and reliability. This cascading approach may be beneficial in complex networks or systems where there can be variations in path availability or quality, helping the system to dynamically adapt to these changes for optimal performance.

Figure 6:
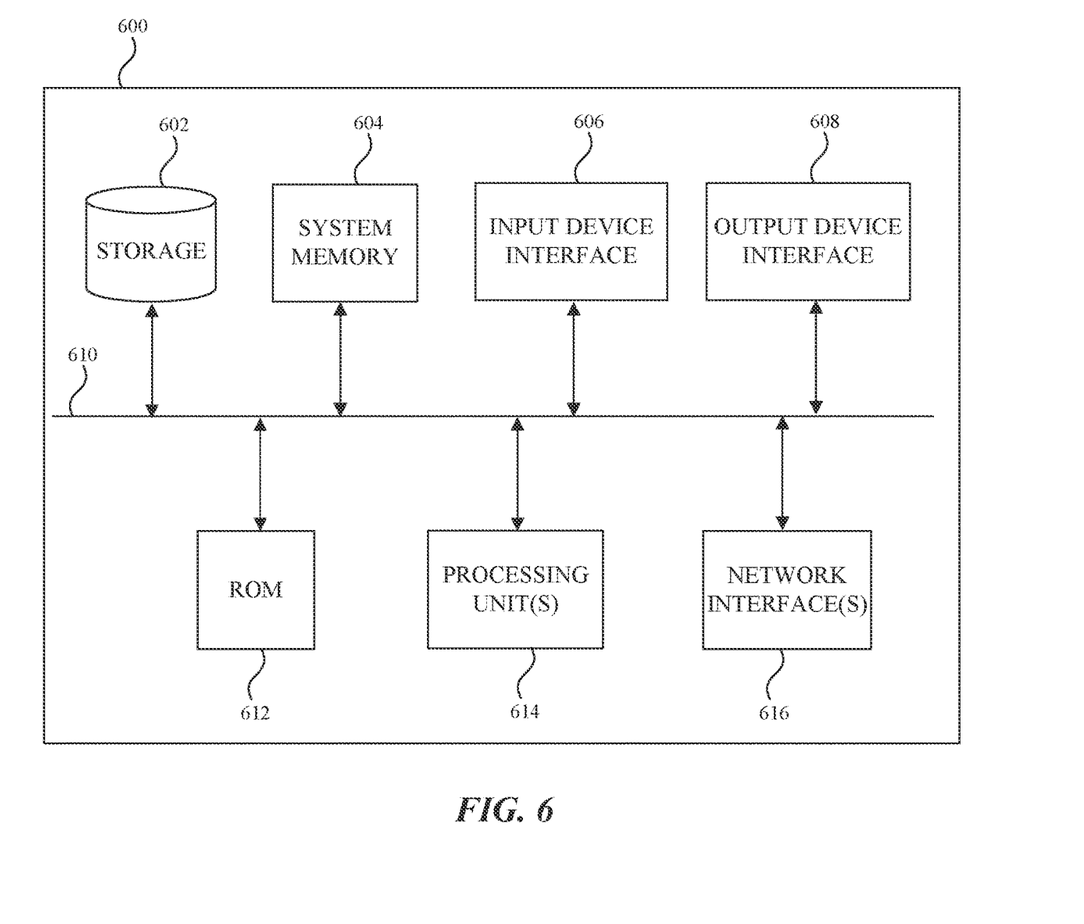
FIG. 6 depicts an example electronic system with which aspects of the present disclosure may be implemented, in accordance with one or more implementations.

FIG. 6 depicts an example electronic system 600 with which aspects of the present disclosure may be implemented, in accordance with one or more implementations. The electronic system 600 can be, and/or can be a part of, any electronic device for generating the features and processes described in reference to FIGS. 1-5, including but not limited to a laptop computer, tablet computer, smartphone, and wearable device (e.g., smartwatch, fitness band). The electronic system 600 may include various types of computer-readable media and interfaces for various other types of computer-readable media. The electronic system 600 includes one or more processing unit(s) 614, a persistent storage device 602, a system memory 604 (and/or buffer), an input device interface 606, an output device interface 608, a bus 610, a ROM 612, one or more processing unit(s) 614, one or more network interface(s) 616, and/or subsets and variations thereof.

The bus 610 collectively represents all system, peripheral, and chipset buses that communicatively connect the numerous internal devices of the electronic system 600. In one or more implementations, the bus 610 communicatively connects the one or more processing unit(s) 614 with the ROM 612, the system memory 604, and the persistent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations.

The ROM 612 stores static data and instructions that are needed by the one or more processing unit(s) 614 and other modules of the electronic system 600. The persistent storage device 602, on the other hand, may be a read-and-write memory device. The persistent storage device 602 may be a non-volatile memory unit that stores instructions and data even when the electronic system 600 is off. In one or more implementations, a mass-storage device (such as a magnetic or optical disk and its corresponding disk drive) may be used as the persistent storage device 602.

In one or more implementations, a removable storage device (such as a floppy disk, flash drive, and its corresponding disk drive) may be used as the persistent storage device 602. Like the persistent storage device 602, the system memory 604 may be a read-and-write memory device. However, unlike the persistent storage device 602, the system memory 604 may be a volatile read-and-write memory, such as RAM. The system memory 604 may store any of the instructions and data that one or more processing unit(s) 614 may need at runtime. In one or more implementations, the processes of the subject disclosure are stored in the system memory 604, the persistent storage device 602, and/or the ROM 612. From these various memory units, the one or more processing unit(s) 614 retrieves instructions to execute and data to process in order to execute the processes of one or more implementations.

The bus 610 also connects to the input device interfaces 606 and output device interfaces 608. The input device interface 606 enables a user to communicate information and select commands to the electronic system 600. Input devices that may be used with the input device interface 606 may include, for example, alphanumeric keyboards, touch screens, and pointing devices. The output device interface 608 may enable the electronic system 600 to communicate information to users. For example, the output device interface 608 may provide the display of images generated by electronic system 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 610 also couples the electronic system 600 to one or more networks and/or to one or more network nodes through the one or more network interface(s) 616. In this manner, the electronic system 600 can be a part of a network of computers (such as a local area network, a wide area network, an Intranet, or a network of networks, such as the Internet). Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as random-access memory (RAM), dynamic random-access memory (DRAM), static random-access memory (SRAM), thyristor random-access memory (T-RAM), compressed random-access memory (Z-RAM), and twin transistor random-access memory (TTRAM). The computer-readable medium also can include any non-volatile semiconductor memory, such as read-only memory (ROM), programmable read-only memory (PROM), erasable programmable read-only memory (EPROM), electrically erasable programmable read-only memory (EEPROM), non-volatile random-access memory (NVRAM), flash, non-volatile static random-access memory (nvSRAM), ferroelectric random-access memory (FeRAM), ferroelectric transistor random-access memory (FeTRAM), magneto resistive random-access memory (MRAM), parallel random-access machine (PRAM), conductive bridging random-access memory (CBRAM), silicon-oxide-nitride-oxide-silicon (SONOS), resistive random access memory (RRAM), nano random-access memory (NRAM), racetrack memory, floating junction gate (FJG), and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be re-arranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together into a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, an embodiment, the embodiment, another embodiment, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, by an electronic device from a user device, a request for obtaining data associated with the user device, wherein the request is addressed to a destination device;
   determining, with a first controller of the electronic device, whether to transmit the request to the destination device via a first path associated with the first controller based on a first success rate of the first path that is monitored by the first controller;
   determining, with the first controller of the electronic device, not to transmit the request to the destination device via the first path; and
   in response to determining not to transmit the request to the destination device via the first path, passing the request to a second controller of the electronic device to transmit the request to the destination device via a second path associated with the second controller.

2. The method of claim 1, wherein the first success rate is based on at least one of an availability of the first path or a latency of the first path.

3. The method of claim 1, further comprising:
   obtaining, by the electronic device and from the destination device, a status of the request; and
   updating, based on the status, the first success rate for a subsequent request.

4. The method of claim 1, wherein determining whether to transmit the request to the destination device comprises:
   determining, by the electronic device, an acceptance rate associated with the destination device; and
   in response to the acceptance rate being below a minimum acceptance rate, causing, by the electronic device, the request to be transmitted to the destination device.

5. The method of claim 1, further comprising:
   receiving, by the electronic device and after receiving the request, a second request for obtaining second data, wherein the second request is addressed to a second destination device;
   determining, by the electronic device and in response to receiving the second request, whether the second controller is available; and
   in response to determining that the second controller is not available, transmitting, by the electronic device, the second request to the second destination device via the first path.

6. The method of claim 1, further comprising, before receiving the request:
   arranging, by the electronic device, the first controller and the second controller based on a predetermined prioritization of one or more paths such that the first controller receives the request before the second controller.

7. The method of claim 6, wherein the predetermined prioritization is based on a first cost associated with the first controller and a second cost associated with the second controller.

8. The method of claim 6, further comprising:
   re-arranging, by the electronic device, the first controller and the second controller based on another predetermined prioritization of the one or more paths such that the second controller receives the request before the first controller.

9. The method of claim 1, wherein the first controller is a Proportional-Integral-Derivative (PID) controller.

10. An electronic device comprising:
    a memory; and
    a processor configured to:
      receive, by the electronic device from a user device, a request for obtaining data associated with the user device, wherein the request is addressed to a destination device;
      determine, with a first controller of the electronic device, whether to transmit the request to the destination device via a first path associated with the first controller, based on a first success rate of the first path that is monitored by the first controller;
      determine, with the first controller of the electronic device, not to transmit the request to the destination device via the first path; and
      in response to determining not to transmit the request to the destination device via the first path, pass the request to a second controller of the electronic device to transmit the request to the destination device via a second path associated with the second controller.

11. The electronic device of claim 10, wherein the first success rate is based on at least one of an availability of the first path or a latency of the first path.

12. The electronic device of claim 10, wherein the processor is further configured to:
    obtain, by the electronic device and from the destination device, a status of the request; and
    update, based on the status, the first success rate for a subsequent request.

13. The electronic device of claim 10, wherein determining whether to transmit the request to the destination device comprises:
    determining, by the electronic device, an acceptance rate associated with the destination device; and
    in response to the acceptance rate being below a minimum acceptance rate, causing, by the electronic device, the request to be transmitted to the destination device.

14. The electronic device of claim 10, wherein the processor is further configured to:
    receive, after receipt of the request, a second request for obtaining second data, wherein the second request is addressed to a second destination device;
    determine, by the electronic device and in response to receiving the second request, whether the second controller is available; and
    in response to determining that the second controller is not available, transmitting, by the electronic device, the second request to the second destination device via the first path.

15. The electronic device of claim 10, wherein the processor is further configured to, before receiving the request:
    arrange, by the electronic device, the first controller and the second controller based on a predetermined prioritization of one or more paths such that the first controller receives the request before the second controller.

16. The electronic device of claim 15, wherein the predetermined prioritization is based on a first cost associated with the first controller and a second cost associated with the second controller.

17. The electronic device of claim 15, wherein the processor is further configured to:
re-arrange, by the electronic device, the first controller and the second controller based on another predetermined prioritization of the one or more paths such that the second controller receives the request before the first controller.

18. A non-transitory computer-readable medium comprising:
computer-readable instructions that, when executed by a processor, cause the processor to perform one or more operations comprising:
receiving, by an electronic device from a user device, a request for obtaining data associated with the user device, wherein the request is addressed to a destination device;
determining, with a first controller of the electronic device, whether to transmit the request to the destination device via a first path associated with the first controller based on a first success rate of the first path that is monitored by the first controller;
determining, with the first controller of the electronic device, not to transmit the request to the destination device via the first path; and
in response to determining not to transmit the request to the destination device via the first path, passing the request to a second controller of the electronic device to transmit the request to the destination device via a second path associated with the second controller.

19. The non-transitory computer-readable medium of claim 18, wherein the first success rate is based on at least one of an availability of the first path or a latency of the first path.

20. The non-transitory computer-readable medium of claim 18, wherein the processor is further configured to:
obtain, by the electronic device and from the destination device, a status of the request; and
update, based on the status, the first success rate for a subsequent request.

* * * * *

UNITED STATES PATENT AND TRADEMARK OFFICE
CERTIFICATE OF CORRECTION

| | | |
|---|---|---|
| PATENT NO. | : 12,323,321 B2 | Page 1 of 1 |
| APPLICATION NO. | : 18/236364 | |
| DATED | : June 3, 2025 | |
| INVENTOR(S) | : Ji Huang et al. | |

It is certified that error appears in the above-identified patent and that said Letters Patent is hereby corrected as shown below:

In the Claims

Column 16; Line Nos. 16-17 Claim 10: Replace "first controller, based" with: --first controller based--.

Signed and Sealed this
Sixteenth Day of September, 2025

Coke Morgan Stewart
*Acting Director of the United States Patent and Trademark Office*